Figure 1:
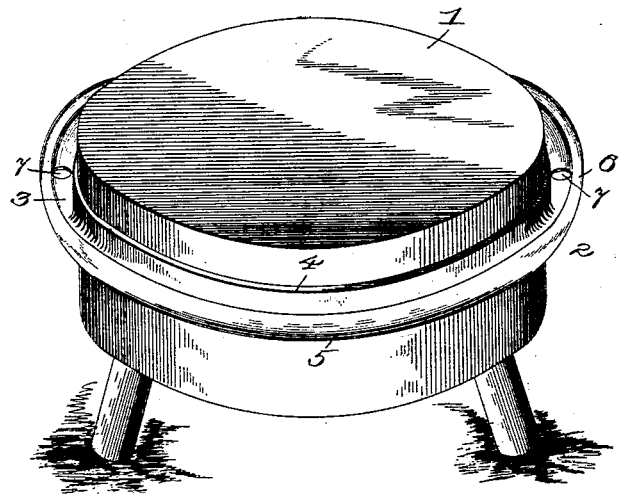

(No Model.)

J. L. FOLTZ.
TROUGH FOR MEAT BLOCKS.

No. 588,057. Patented Aug. 10, 1897.

Witnesses
F. L. Mockabee.
R. M. Smith

Inventor
Jacob L. Foltz,
By his Attorneys,
C. A. Snow & Co.

THE NORRIS PETERS CO., PHOTO-LITHO., WASHINGTON, D. C.

UNITED STATES PATENT OFFICE.

JACOB L. FOLTZ, OF MOVILLE, IOWA.

TROUGH FOR MEAT-BLOCKS.

SPECIFICATION forming part of Letters Patent No. 588,057, dated August 10, 1897.

Application filed April 27, 1896. Serial No. 589,259. (No model.)

*To all whom it may concern:*

Be it known that I, JACOB L. FOLTZ, a citizen of the United States, residing at Moville, in the county of Woodbury and State of Iowa, have invented a new and useful Trough for Meat-Blocks, of which the following is a specification.

This invention relates to troughs for butchers' meat-blocks; and the object in view is to provide a flexible trough conformable and adapted to be applied to blocks of different cross-sectional shapes, the said trough being practically indestructible, unaffected by atmospheric changes, capable of being adjusted to any desired height or position upon the block, and adapted to catch all scraps falling from the edges of the block and prevent the same from dropping upon the floor or ground. The trough may be readily removed and replaced whenever desired, and has provision whereby it may be readily cleansed.

The invention consists in an improved catch-trough embodying certain novel features and advantages hereinafter specifically set forth, illustrated in the drawings, and pointed out in the claim.

Figure 2:
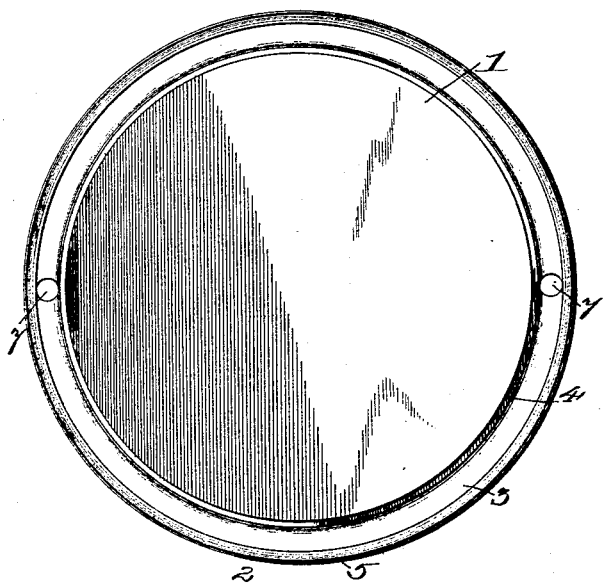
Figure 3:
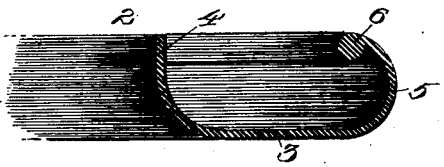

In the accompanying drawings, Figure 1 is a perspective view of a butcher's meat-block, showing the improved trough applied thereto. Fig. 2 is a plan view of the same. Fig. 3 is an enlarged cross-sectional view of the trough, taken at one side.

Similar numerals of reference designate corresponding parts in the several figures of the drawings.

The catch-trough contemplated in this invention is applicable to meat or chopping blocks of any size or shape, but for the purpose of illustration is shown as applied to a cylindrical or round block, (indicated at 1.) The trough (indicated at 2) comprises a substantially horizontal base portion or main body 3, an inner substantially vertical flange portion 4, which bears against the outer surface of the block, and an outer peripheral guard or flange 5, made, preferably, of semicircular shape in cross-section and provided at its extreme edge with an enlarged bead or reinforcement 6.

The trough as a whole is made continuous or in the form of an annulus, having an open center by which it is adapted to surround the block 1. The trough is also made of rubber or other similar and suitable material, whereby sufficient flexibility or elasticity is obtained to render the trough conformable to the shape of the block. Such material also renders the trough non-corrosive and incapable of being affected by atmospheric changes. The trough is thus practically indestructible, and being non-absorbent is capable of being thoroughly cleansed. The cleaning of the trough is facilitated by providing the same at suitable points with openings 7, through which the contents of the trough may be discharged, the said openings also serving to drain the trough. The bead 6 reinforces the projecting edge of the trough where it is subjected to the greatest wear and prevents the breaking down of the trough at its peripheral portion.

It will thus be seen that by reason of its flexibility the trough may be applied to blocks of different sizes and shapes, that it may be adjusted to any desired height thereon and to a horizontal or inclined position, that it will fit closely to the block and conform to any irregularity in the surface thereof, thus enabling it to catch all scraps that fall from the block, and that it may be readily removed and replaced whenever desired.

It will also be apparent that by reason of the flexibility of the trough it will readily yield when anything comes in contact therewith, that it will not warp or become twisted or permanently indented, that it will not corrode, and that it is practically indestructible.

It will be understood that the trough is susceptible of various changes in the form, proportion, and minor details of construction, which may accordingly be resorted to without departing from the spirit or sacrificing any of the advantages of this invention.

Having thus described the invention, what is claimed as new is—

A trough for butchers' chopping-blocks consisting of an integral annulus of elastic and non-absorbing material, the outer upwardly-extending flange of which is semicircular in vertical cross-section and reinforced, and the inner flange substantially vertical and more elastic or yielding than the outer flange, substantially as and for the purpose specified.

In testimony that I claim the foregoing as my own I have hereto affixed my signature in the presence of two witnesses.

JACOB L. FOLTZ.

Witnesses:
JOHN W. NORRISH,
WILLIAM J. HARRIS.